United States Patent

Tyma

Patent Number: 5,903,761
Date of Patent: May 11, 1999

[54] METHOD OF REDUCING THE NUMBER OF INSTRUCTIONS IN A PROGRAM CODE SEQUENCE

[75] Inventor: Paul Tyma, Broadview Heights, Ohio

[73] Assignee: PreEmptive Solutions, Inc., Euclid, Ohio

[21] Appl. No.: 08/961,717

[22] Filed: Oct. 31, 1997

[51] Int. Cl.[6] ........................................... G06F 9/45
[52] U.S. Cl. ........................................... 395/709
[58] Field of Search ........................ 395/705–709

[56] References Cited

U.S. PATENT DOCUMENTS

| | | | |
|---|---|---|---|
| 4,965,724 | 10/1990 | Utsumi et al. | 395/707 |
| 5,287,510 | 2/1994 | Hall et al. | 395/709 |
| 5,396,631 | 3/1995 | Hayashi et al. | 395/707 |
| 5,596,732 | 1/1997 | Hosoi | 395/709 |
| 5,805,895 | 9/1998 | Breternitz, Jr. et al. | 395/709 |
| 5,835,776 | 11/1998 | Tirumalai et al. | 395/709 |

OTHER PUBLICATIONS

Jason Steinhorn, Compiling Java, Embedded Systems Programming, pp. 42–56, Sep. 1998.

Instantiations. Inc. Java Speed Barrier Smashed; Key Benchmarks Indicate New JOVE Technology Produces Java Speeds up to 15 Times that of Current Technologies, Internet–WWW, Jul. 29, 1998.

*Primary Examiner*—Tariq R. Hafiz
*Assistant Examiner*—Wei Zhen
*Attorney, Agent, or Firm*—Blakely, Sokoloff Taylor & Zafman LLP

[57] ABSTRACT

A method of reducing the number of instructions in a computer program. A program definition instruction and a use instruction that operate on the same program variable are identified. If the use instruction may be moved ahead of one or more other instruction in the computer program to be adjacent the definition instruction, then the use instruction and the definition instruction are removed from the computer program.

21 Claims, 8 Drawing Sheets

```
//    swapping two variables (a and b) in Java int temp = a;
a = b;
b = temp;
```

FIG. 1

```
COMPILED FIGURE 1 iload_1
    istore_3
    iload_2
    istore_1
    iload_3
    istore_2
```

FIG. 2

```
AFTER PUSH MIGRATION        AFTER CODE REMOVAL iload_1                     iload_1
    istore_3                    iload_2
    iload_3   // moved          istore_1
    iload_2                     istore_2
    istore_1
    istore_2
```

FIG. 3

```
    var1 = var3 + var4;
    var3 = var2;
    var2 = var1 + var4;
    var5 = 55 - var2;
    var3 = var3 - var5;
    var3 = var3 * 100;
```

FIG. 4

METHOD OF REDUCING THE NUMBER OF INSTRUCTIONS IN A PROGRAM CODE SEQUENCE

FIELD OF THE INVENTION

The present invention relates to the field of computer science, and more particularly to a method of reducing the number of instructions in a sequence of compiled program code.

BACKGROUND OF THE INVENTION

Some modern compilers, most notably the Java compiler from Sun Microsystems, are designed to compile source code (e.g., Java programs) into sequences of instructions to be executed on a stack-based virtual machine. A key benefit of compiling source code for execution on a virtual machine is that the compiled code may be executed by any processor that can be programmed to implement the virtual machine, regardless of the processor's internal architecture.

One drawback to compiling code for execution on a virtual machine is that execution is usually much slower than if the program had been compiled into native instructions executable by the underlying processor. In a stack-based virtual machine like the Java virtual machine, the stack is usually maintained in system memory so that stack push and pop operations are relatively time consuming and contribute to the relatively slow execution rate of the virtual machine.

Another drawback to compiling code for execution on a virtual machine is that the compiled code tends to be easy to reverse compile into a version of the original source code. This is a serious concern for many software developers. After spending large amounts of time and money developing a software program, developers do not want to place the program in the public domain in a form that gives away the source code.

SUMMARY OF THE INVENTION

A method of reducing the number of instructions in a computer program is disclosed. A definition instruction and a use instruction that operate on the same variable of the computer program are identified. A determination is made as to whether the use instruction may be moved ahead of one or more other instructions in the computer program so that it is adjacent the definition instruction. If the use instruction may be moved to be adjacent the definition instruction, the use instruction and the definition instruction are removed from the computer program.

BRIEF DESCRIPTION OF THE DRAWINGS

The present invention is illustrated by way of example and not limitation in the figures of the accompanying drawings in which like references indicate similar elements and in which:

FIG. 1 is a Java source code listing.

FIG. 2 is a sequence of Java bytecodes that result from compilation of the source code of FIG. 1.

FIG. 3 is a modified version of the sequence of Java bytecodes in FIG. 2.

FIG. 4 is a Java source code listing.

DETAILED DESCRIPTION

Figure 5:
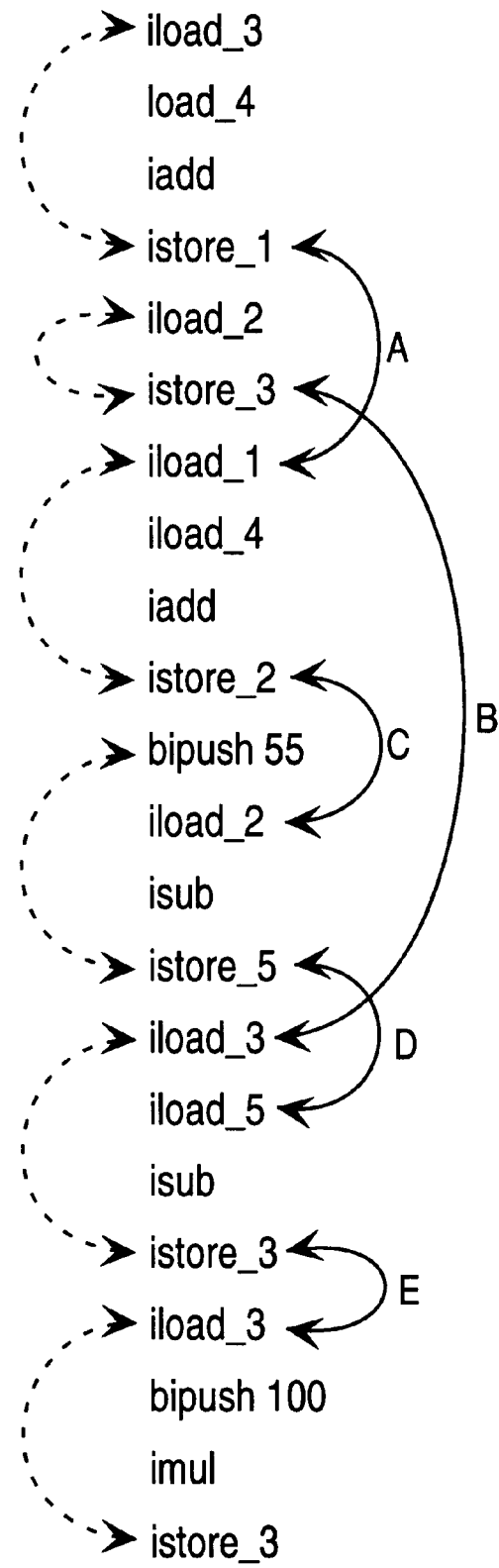
FIG. 5 is a sequence of Java bytecodes that result from compilation of the source code of FIG. 4.

A method for reducing the number of instructions in stack-based program code is disclosed. According to one embodiment, the program code is iteratively analyzed to determine opportunities for instruction removal. The superlative requirement for the possibility of instruction removal is that program output is equivalent before and after transformation. Many opportunities are present because of limitations of the original programming language and/or common programming design techniques, which are known as "good design" but translate poorly to stack-based virtual machine instructions. These opportunities manifest themselves as the ability to remove instructions that deal with storage of transient values into memory. Storing and recalling transient values from memory is a common, often necessary, practice in register-based machines. In stack-based machines, however, storing and recalling transient values from memory often becomes superfluous because the stack is inherently a place for temporary storage.

In the present invention, the rate of program execution is increased by eliminating unnecessary stack push and pop operations. In interpreted environments and in processors which execute instructions directly, fewer instructions means reduced execution time. A Just-in-Time (JIT) compiled environment converts stack-based program code into register-based program code immediately prior to execution. Complex code sequences tend to impede the expediency and effectiveness of this process. Therefore, in JIT environments code size reduction also results in faster execution times.

In one embodiment, code reordering and instruction replacement is used to increase the number of stack push and pop instructions that can be eliminated. As discussed below, one highly desirable effect of such code reordering and instruction replacement is that the modified code cannot be easily reverse compiled to obtain the original source code. This effect is referred to as obfuscating the source code. In other words, application of one or more embodiments of the present invention to reduce the number of instructions in a program code sequence not only speeds program execution, but also obfuscates the source code from which the program code sequence is generated.

The Java programming language from Sun Microsystems is used as an example throughout the following description because of its applicability to being compiled into a stack-based intermediate representation ("Java" and "Sun" are trademarks of Sun Microsystems, Inc.). The Java programming language is compiled primarily into an intermediate representation known as bytecodes. Bytecodes are instructions that can be executed by a Java virtual machine. Because the Java virtual machine is implemented by execution of a program that has been ported to most popular computer architectures, Java programs can be run on many different types of computers (e.g., Intel, Macintosh, IBM RISC, etc.) without modification. Unfortunately, this "program which runs programs" abstraction (i.e., execution of program to implement Java virtual machine which then executes Java bytecodes) has taken its toll in terms of execution speed. Java programs are notoriously slow. The present invention can be used to help speed up execution of Java programs and other stack-based program code.

Bytecodes

Java bytecodes are similar to most assembly languages except that they are stack-based. For example, an expression in Java such as:

x=y+4;

would compile to bytecodes that look like:

```
iload_2      // "_2" denotes variable y
bipush 4     // push a constant 4
iadd         // add the two top stack elements
istore_1     // "_1" denotes variable x
```

The iload_2 instruction loads the value from variable y and pushes it on top of a stack maintained by a Java virtual machine. As indicated in the comment field, the "_2" suffix denotes variable y. The bipush instruction pushes the constant 4 onto the stack. The iadd instruction pops the top two values off the stack (the value of y and the constant), adds them, and then pushes the sum onto the stack. The istore instruction pops the sum off the stack and stores it into variable x. Note that local variable names at runtime are lost after compilation and are merely designated by an ordinal number (i.e., _2 denotes variable y, _1 denotes variable x). Also note that the "i" prefix of many instructions indicates an integer instruction. The examples herein are restricted to integers for clarity, but by no means is the invention limited to integers. The invention is equally effective when operating on floating point or Boolean types (i.e., instructions such as lload, fload, dload, etc.). The canonical stack operation "push" occurs in several different Java bytecodes including bipush, sipush, and iload. The "pop" operation analogously is emulated with istore among others.

Examining sequences of code is simplified by partitioning the code into basic blocks. A basic block is a program code sequence (typically assembly code) that includes no goto statements leading out of the program code sequence and that is not entered (except at the first instruction) by a goto statement that is external to the program code sequence. If a code sequence includes a goto statement that exits the code sequence, or if the code sequence is entered at some point by a goto statement that resides outside the code sequence, then that code sequence would be divided into two or more basic blocks at the points of entry and exit.

Transient Variables

FIG. 1 is a portion of Java source code that, when compiled and executed, causes the contents of two variables to be swapped. As FIG. 1 shows, a temporary (i.e., transient) variable called "temp" is needed to hold the initial value of variable "a" so that variable "a" can be overwritten without loss of its initial value. Otherwise, the initial value of variable "a" would not be available to be stored in variable "b". If the source code programmer had direct access to a stack in a stack-based machine (virtual or otherwise) the programmer could store the initial value of variable "a" on the stack. However, access to the stack of a stack-based machine is typically not available to the programmer so that the "temp" variable is required. In one embodiment of the present invention, the compiled version of the code in FIG. 1 is reordered in a manner that does not destroy the execution result of the code, but which allows instructions associated with the temp variable to be removed in favor of storage on the stack of a stack-based machine.

FIG. 2 shows a Java bytecode sequence that results from compiling the Java source code in FIG. 1. In the bytecode sequence, the source code variables "a", "b" and "temp" are indicated by the suffixes _1, _2 and _3, respectively. For example, when executed, the iload_1 instruction causes the contents of variable "a" to be pushed onto the stack of a Java virtual machine, the istore_3 instruction causes the value at the top of the stack (i.e., the contents of variable "a") to be popped off the stack and stored in "temp", and so forth.

FIG. 3 illustrates the Java bytecode sequence of FIG. 2 after it has been modified by a technique called "push migration". Push migration is the act of moving (i.e., reordering) stack push instructions (i.e., instructions such as "iload" which cause a value to be pushed onto a stack) as near to the beginning of a code sequence as possible. As discussed below, significant restrictions on instruction reordering exist and therefore FIG. 3 displays only one allowable move: iload_3 from the second to last statement to immediately after the istore_3. In another operation, called "definition-use pair removal", the legality of removing the iload_3 and istore_3 instructions is determined. Accepting for now that the iload_3 and the istore_3 instructions can be removed, the code sequence is reduced to four instructions that perform the same operation as the original six, without the overhead of the temp variable. This is significant not only for the reduced number of instructions, but also because of the iload_3 and istore_3 instructions involve time-consuming memory access. Consider that to perform the istore_3 in the original version, the top of stack is read (a memory access), a stack pointer is updated (a memory access or register update), and a value is assigned to temp (another memory access). The iload_3 requires analogous effort. Thus, by removing the iload_3 and istore_3 instructions, execution time is significantly reduced.

Still referring to FIG. 3, note that the code sequence of FIG. 3 takes advantage of the last-in, first-out nature of the stack to avoid having to access the temp variable (i.e., avoiding the istore_3 and the iload_3 instruction). Even though this code is completely legal within the Java virtual machine, it cannot be easily be obtained by reformulating the Java source code. More importantly, at least from a source code obfuscation standpoint, it is not a simple matter to regenerate the original source code of FIG. 1 by reverse compiling the bytecode sequence of FIG. 3. The reason for this is that the Java programming language, like many high-level programming languages, does not provide a source-level construct that allows a variable merely to be pushed onto the stack without there being an associated operation on the pushed value. Note that the source code in FIG. 1 is fairly simple. When bytecodes obtained from a larger, more complex portion of source code are reordered, it becomes substantially more difficult to regenerate the original source code. Thus, code reordering according to embodiments of the present invention provides a significant impediment to would-be copyists.

FIG. 4 depicts a sequence of Java source code statements that are assumed to constitute a basic block of code. That is, it is assumed that there are no goto statements into or out of this sequence (note that there may be a goto to the first instruction of the sequence). This sequence of source code statements, and the bytecodes that result from its compilation are used throughout the remainder of this description to explain various embodiments of the present invention.

Stack-Balanced Instruction Sequences

FIG. 5 illustrates a compiled version of the expression sequence of FIG. 4. FIG. 5 also illustrates a partitioning of the code sequence in two ways. The dotted arrows on the left mark code sequences called "stack-balanced blocks" (or "stack-balanced instruction sequences"). Stack-balanced blocks are instruction sequences that, after execution, leave the stack in the same state as before execution. More specifically, a stack-balanced block is a sequence of instructions that, when executed, causes an equal number of stack push and pop operations to take place in an order such that, throughout execution of the sequence of instructions, the number of completed stack pop operations does not exceed the number of completed stack push instructions. Thus, it is perfectly legal for instructions within a stack-balanced block to push values onto the stack, but the values must be popped off the stack by the end of the stack-balanced block so that the stack is unchanged. As discussed below, in at least one embodiment of the present invention, stack-balanced blocks are identified and used to determine the legality of instruction reordering.

Definition Instructions, Use Instructions and Definition-Use Pairs

According to one embodiment of the present invention, the number of instructions in stack-based program code is reduced by removing definition instructions and use instructions that constitute definition-use pairs. A definition instruction is an instruction to pop a value off a stack and into a memory location reserved for a program variable (e.g., a store instruction in a Java bytecode sequence). A use instruction is an instruction that obtains a value from a memory location reserved for a program variable and pushes the instruction onto the stack (e.g., a load instruction in a Java bytecode sequence). Note that for both definition and use instructions the memory location of the program variable may be transitory, as in the case of a cache memory location.

The expression "definition-use pair" refers to a definition instruction and a use instruction that operate on the same program variable. As discussed below, the candidates for instruction removal are definition-use pairs in which the constituent definition and use instructions are adjacent or can be made adjacent without destroying the integrity of the code sequence. For example, the double-headed arrow E in FIG. 5 indicates an adjacent definition-use pair. The other arrows A, B, C and D identify definition-use pairs in the listing that are not adjacent. According to one embodiment of the present invention, the instructions are reordered to the extent legally possible to create adjacent definition-use pairs. Herein, a legal instruction reordering or other change to a program code sequence refers to an instruction reordering or other change that does not affect the execution result of the code sequence, except that deeper stack usage may occur. As discussed below, one technique for ensuring the legality of instruction reordering, is to prevent interlacing (i.e., partial overlapping) of stack-balanced blocks.

Removal of Adjacent Definition-Use Pairs; Subsequent Use Instructions

According to one embodiment, any adjacent definition-use pair may be removed so long as the variable referenced by the pair is not used in any subsequent instruction in the code sequence. Herein, use of a variable refers to pushing the variable onto the stack. The scope of a subsequent use determination is limited to the method, function or procedure that contains the definition-use pair. Assuming that the code sequence shown in FIG. 4 constitutes an entire function, then the pair E may legally be removed because variable 3 is not used after pair E. (Note that variable 3 is defined after pair E, but not used.) By removing pair E, the result of the isub instruction (preceding the istore_3) is cached on top of the stack until it is popped by the imul instruction in the subsequent stack-balanced block. Also, removal of the definition-use pair E causes their respective stack-balanced states to merge.

Figure 6:
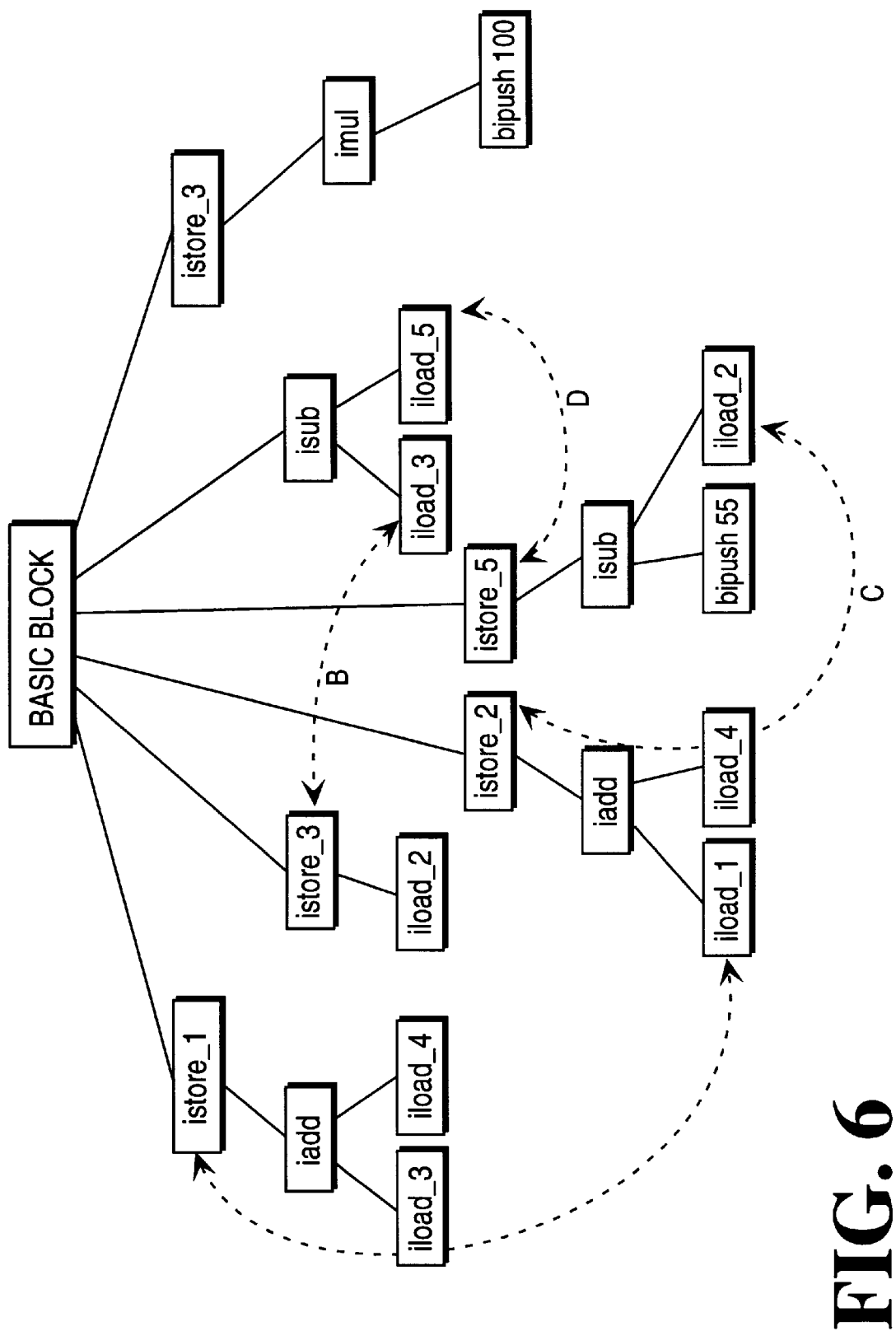
FIG. 6 is a directed-acyclic graph that corresponds to a modified version of the bytecode sequence of FIG. 5.

FIG. 6 illustrates the code sequence of FIG. 5 in a directed-acyclic graph (DAG). A post-order traversal of the graph yields the original code sequence, less the removal of definition-use pair E. Each sub-tree corresponds to a stack-balanced block. The dashed arrows A, B, C and D indicate the location in the DAG of the constituent instructions of definition-use pairs. The fact that the definition-use pair E has been removed from the code sequence can be seen in the rightmost two subtrees.

Overview of a Method According to One Embodiment

Figure 7:
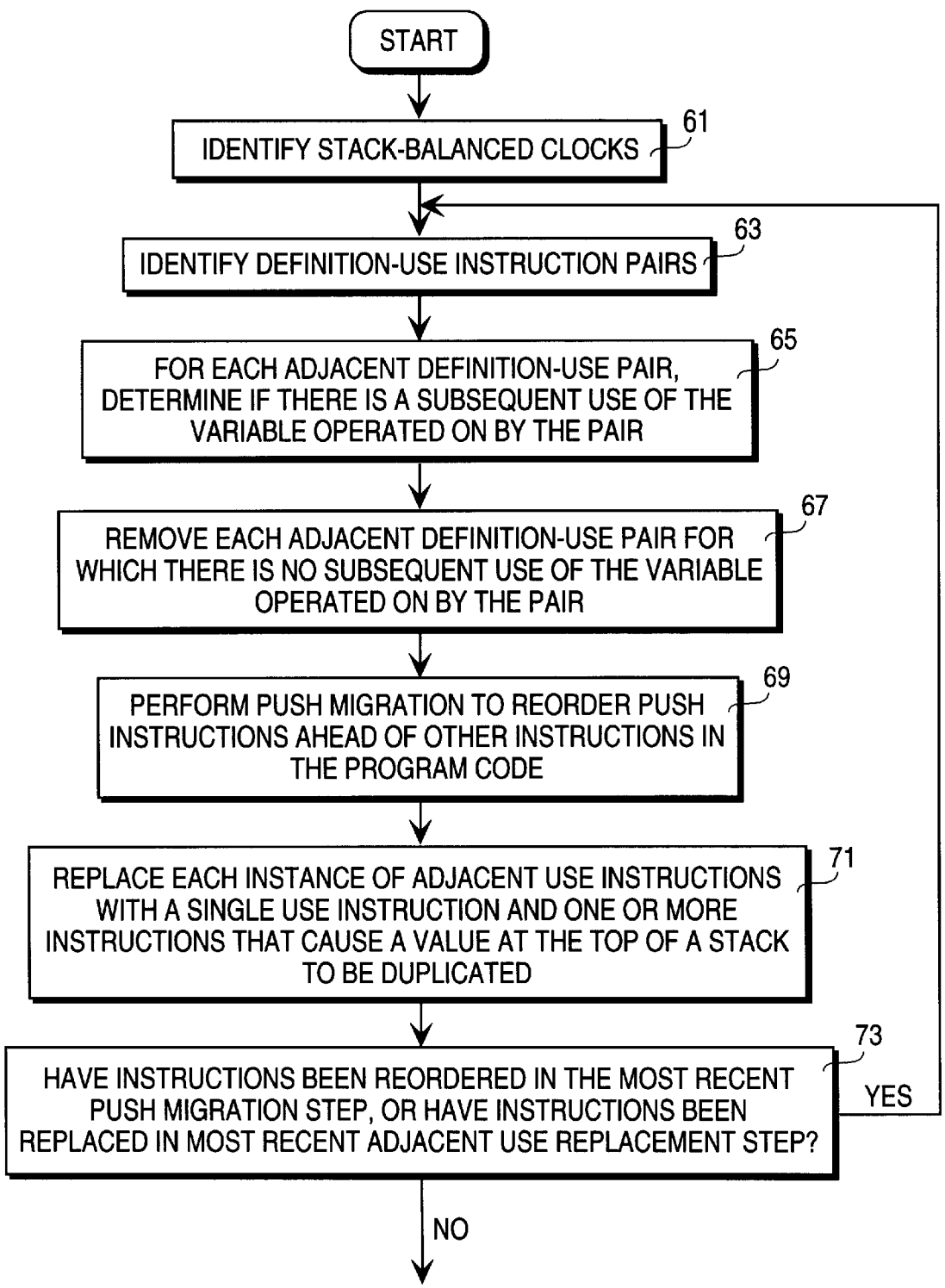
FIG. 7 is a method diagram according to one embodiment of the present invention.

According to one embodiment of the present invention, the number of instructions in stack-based program code may be removed using the method of FIG. 7. At step 61, stack-balanced blocks in the program code are identified. At step 63, definition-use instruction pairs in the program code, both adjacent and non-adjacent, are identified. For each of the definition-use pairs identified in step 63 that are adjacent, the program code is examined to determine whether there is a subsequent use instruction at step 65. Each of the adjacent definition-use pairs for which there is no subsequent use instruction are removed from the program code at step 67. At step 69, push migration is performed to reorder push instructions ahead of other instructions in the program code to the extent legal. The determination of whether a given instruction reordering is legal is discussed below. At step 71, adjacent uses of the same program variable (i.e., adjacent use instructions) are replaced by a single use instruction and one or more instructions that cause the value at the top of the stack to be duplicated on the stack. This is a code replacement step and is discussed further below. According to one embodiment, if no code reordering or code replacement occur in steps 69 and 71, respectively, then the method is completed, otherwise the method loops back to step 63 and steps 63, 65, 67, 69 and 71 are repeated. This is indicated by decision step 73. Thus, there may be multiple iterations of steps 63, 65, 67, 69 and 71 before the method is completed. The above-recited steps are discussed in further detail below.

Identifying Stack-Balanced Blocks

According to one embodiment, stack-balanced blocks in a program code sequence are identified by examining the code sequence in reverse order. Each instruction is evaluated according to what it takes (i.e., pops) from the stack and what it gives (i.e., pushes) to the stack. Starting at the bottom instruction of the code sequence of FIG. 5 and proceeding upward:

| | | |
|---|---|---|
| istore_3 | // takes 1, gives 0, | cum. stack depth: 1 |
| imul | // takes 2, gives 1, | cum. stack depth: 2 |
| bipush 100 | // takes 0, gives 1, | cum. stack depth: 1 |
| iload_3 | // takes 0, gives 1, | cum. stack depth: 0 |

The bottom instruction of the code sequence is considered to mark the end of a stack-balanced sequence of instructions. Proceeding upward, when an instruction is reached that returns the stack depth to zero (i.e., zero stack depth relative to the starting stack depth of a basic block), that instruction is considered to mark the beginning of the stack-balanced sequence of instructions. The remainder of the code sequence is similarly examined to find other stack-balanced sequences of instructions.

Identifying Definition-Use Instruction Pairs

According to one embodiment, definition-use pairs are identified by traversing a program code sequence from beginning to end. Each time a definition (e.g., a store) of a given variable is found, it is noted and the scan continues. If a use (e.g., a load) of the same variable is found, then the store and load are marked as a definition-use pair. Single definitions, single uses, and "use-definition" pairs (e.g., a load of a variable followed by a store of the variable) are not considered to be definition-use pairs.

Subsequent Use and Adjacent Definition-Use Pair Removal

As discussed above in reference to FIG. 5, adjacent definition-use pairs may be removed from the instruction sequence so long as there is no subsequent use of the variable. There are several techniques for determining whether there is a subsequent-use, including live variable analysis, reaching definitions, use-definition chains, and others. Generally, any technique may be used to determine subsequent use without departing from the spirit and scope of the present invention. Once it is determined that the variable has no subsequent use, the adjacent definition-use pair (i.e., the store and load statements) is removed from the code.

Push Migration

According to one embodiment, push migration is performed in an attempt to move all push instructions (i.e., load, bipush, sipush) as near to the beginning of the code sequence as possible. If a push instruction can be moved upward in the code sequence until it is adjacent a corresponding pop of the same variable (i.e., if an adjacent definition-use pair can be created), then both the push and pop instructions can be removed from the code sequence. In one embodiment, push migration is governed by the following rules:

1. A load instruction may not be moved ahead of a store instruction which references the same variable.
2. An instruction which results in a stack push (i.e., a stack push instruction) may not be moved ahead of another stack push instruction that is in the same stack-balanced sequence of instructions. This rule prevents operands from being reversed in non-commutative operations (e.g., X-5 being illegally transformed into 5-X). This rule may be relaxed, however, for commutative operations including, but not limited to, addition and multiplication.
3. A stack push instruction may not be moved into a stack-balanced block from a location outside the stack-balanced block . (Note, a stack push instruction may be moved from one position within a stack-balanced block to another position within the stack-balanced block and a stack push instruction may be moved between the end of one stack-balanced block and the start of the next stack-balanced block).

Figure 8A:
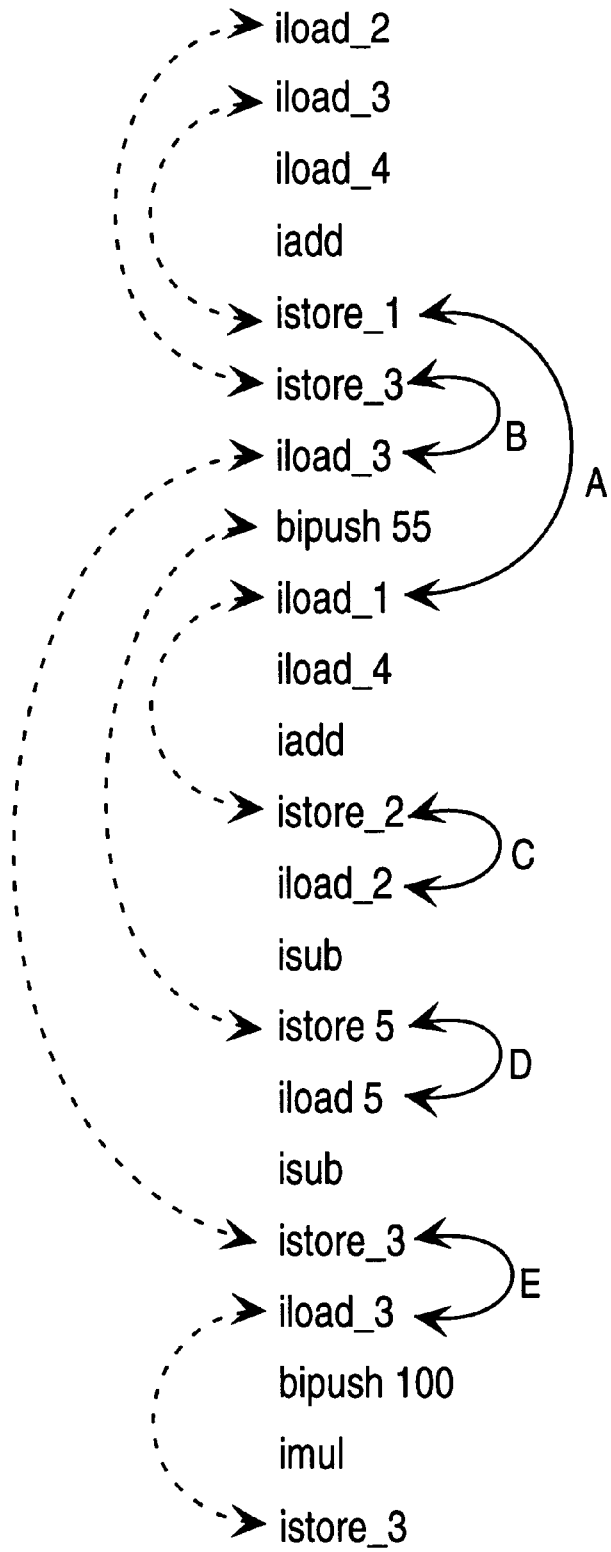
FIG. 8A is a diagram illustrating the use of push migration to reorder instructions in the bytecode sequence of FIG. 5.

FIG. 8A illustrates the state of the code in FIG. 5 after a first push migration has taken place (note that adjacent definition-use pair E remains in the example for clarity). One result that follows from reordering instructions according to the above-stated push migration rules is that stack-balanced blocks are prevented from interlacing. This is indicated by the double-headed arrows on the left side of the code sequence. According to one embodiment, a stack-balanced block may encompass another stack-balanced block, but may not include only part of another stack-balanced block (i.e., stack-balanced blocks may not interlaced). By reordering instructions as discussed above, a deeper use of the stack may at times occur (i.e., a larger portion of stack memory may be used than without reordering), but the instruction reordering does not otherwise change the result achieved by executing the program.

Figure 8B:
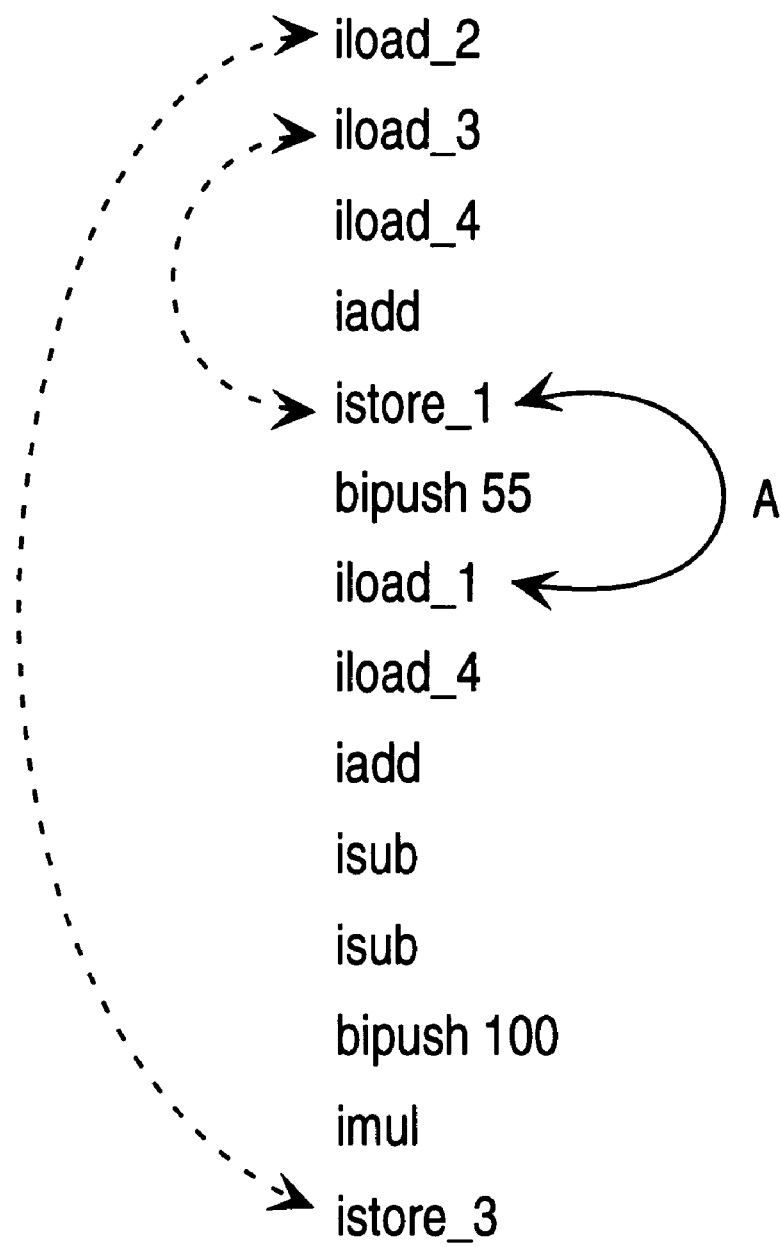
FIG. 8B is a diagram illustrating the removal of adjacent definition-use instruction pairs from the reordered bytecode sequence of FIG. 6.

As shown in FIG. 8A, definition-use pairs B, C, D and E are adjacent definition-use pairs. By removing these adjacent definition-use pairs, the code sequence in FIG. 8B is obtained. Note that definition pair A has not been removed because it is not an adjacent pair. Note also that removal of adjacent definition-use pairs B, C, D and E has caused the six stack-balanced regions of the FIG. 6 code listing to be merged into two stack-balanced regions. This is indicated by the two double-headed arrows on the left side of FIG. 8B.

Adjacent Use Replacement

Because of push migration, code sequences tend to be left in states where pushes are generally in the beginning of the code sequence and pops are at the end. In some cases, use instructions that have been made adjacent (e.g., as a result of push migration), and that push the same value onto the stack, can be replaced by a single use instruction and one or more stack specific instructions that cause the value at the top of the stack to be duplicated. An example of such an instruction include the Java bytecode "dup", which duplicates the top stack element, and the Java bytecode "dup2", which duplicates the top two stack elements.

As an example of replacing adjacent-use instructions, consider the following instruction sequence that might result from push migration:

aload_0
aload_0
aload_0
aload_0

This code sequence includes four adjacent uses of variable 0 and may be replaced by the following:

aload_0
dup
dup2

Not only are dup and dup2 instructions smaller than most load instructions (therefore consuming less code space), but in stack-based machines they usually execute faster than memory-accessing load instructions. Further, after adjacent use replacement, additional opportunities for adjacent pair removal may be created. As an example, consider the following code sequence:

istore_1
// . . . other instructions
iload_1
// . . . other instructions
iload_1

After push migration, the following code sequence is obtained:

istore_1
iload_1
load_1

```
// . . . other instructions
```

Note that the istore instruction and the two iload instructions now form an adjacent definition-use pair followed by another use instruction. As discussed above, the definition-use pair removal rules of one embodiment do not permit removal of the adjacent definition-use pair because of the subsequent use. However, because the two iload instructions operate on the same variable (i.e., variable 1), they constitute adjacent use instructions that can be replaced as follows:

```
istore_1
iload_1
dup
```

Another iteration of the subsequent use determination step will now find that there are no further uses of variable 1 beyond the adjacent definition-use pair. The definition-use pair can now be removed. The dup instruction will remain to duplicate the value present at the top of the stack prior to execution of the now-removed istore_1 instruction.

Iteration

Figure 8C:
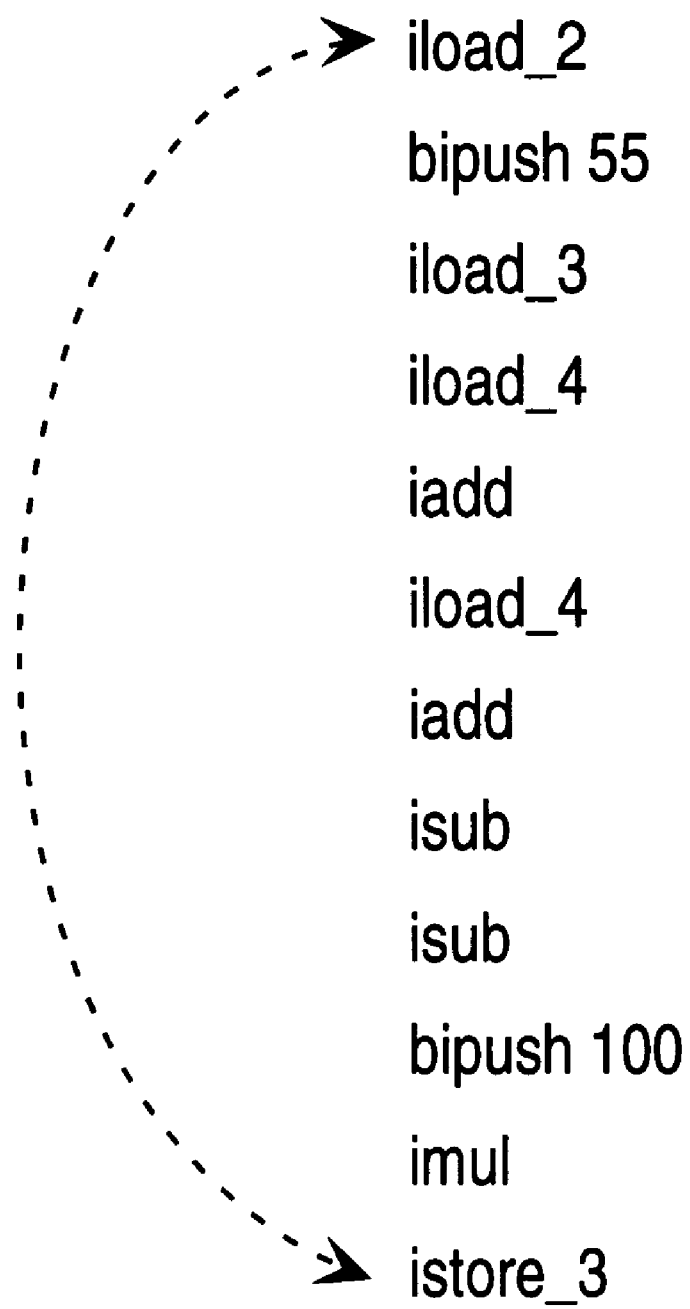
FIG. 8C is a diagram illustrating the result of iteratively performing push migration and adjacent pair removal on the bytecode sequence of FIG. 5.

Some definition-use pairs are not removed in a first execution of the above-described steps of definition-use pair removal, push migration and adjacent use replacement (e.g., definition-use pair A in FIG. 8B). However, such pairs may be removed in subsequent iterations of the removal, migration and replacement steps. One reason for this is that adjacent definition-use pair removal merges stack-balanced blocks and creates opportunities for further push migration. FIG. 8B, for example, shows that adjacent pair removal has caused the bipush_55 statement to be in the middle of an expanded stack-balanced sequence so that it may be moved upward during push migration. Migration of the bipush_55 statement causes definition-use pair A to become an adjacent pair. Consequently, in a second iteration of the definition-use pair removal step, pair A is removed. This is shown in FIG. 8C. As indicated by the double-headed arrow on the left side of FIG. 8C, all of the stack-balanced blocks of the original code sequence have been merged into a single stack-balanced code sequence. This complete merger of stack-balanced blocks is not necessary, or even possible, in every case.

According to one embodiment, the steps of adjacent definition-use pair removal, push migration and adjacent use replacement are repeated until no further push migration or adjacent use replacement is possible. At that point, other techniques for reducing the number of instructions in the code sequence may be applied.

Having described a method for practicing the present invention, it should be noted that the individual steps therein may be performed by a processor programmed with instructions that cause the processor to perform the recited steps, specific hardware components that contain hard-wired logic for performing the recited steps, or any combination of programmed computer components and custom hardware components. Nothing disclosed herein should be construed as limiting the present invention to a single embodiment wherein the recited steps are performed by a specific combination of hardware components. Moreover, in the case of a programmed processor implementation, sequences of instructions which may be executed by a processor to carry out the method of the present invention may be stored and distributed on a computer readable medium or may be transmitted on a transmission media via a carrier wave.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly to be regarded in an illustrative rather than a restrictive sense.

What is claimed is:

1. A method of reducing the number of instructions in a computer program, the method comprising the steps of:
   identifying in the program a definition instruction and a use instruction that operate on the same program variable;
   determining whether the use instruction may be moved ahead of one or more other instructions in the computer program to be adjacent the definition instruction; and
   removing the use instruction and the definition instruction from the computer program if the use instruction can be moved ahead of the one or more other instructions to be adjacent the definition instruction.

2. The method of claim 1 wherein the computer program includes a sequence of instructions that can be executed in a stack-based virtual machine.

3. The method of claim 1 wherein the computer program includes a sequence of Java bytecodes that can be executed in a Java virtual machine.

4. The method of claim 1 wherein the step of determining whether the use instruction may be moved ahead of one or more other instructions to be adjacent the definition instruction includes step of determining whether the use instruction is preceded by a stack push instruction that pushes an operand onto the stack for use in a non-commutative operation with the program variable.

5. The method of claim 1 wherein the step of determining whether the use instruction may be moved ahead of one or more other instructions to be adjacent the definition instruction includes the step of determining whether the definition instruction is within a stack-balanced region that does not include the use instruction and that cannot be altered to include the use instruction.

6. The method of claim 1 further comprising the step of generating the computer program by compiling Java source code into a sequence of Java bytecodes, the definition instruction being a Java store instruction and the use instruction being a Java load instruction.

7. The method of claim 1 wherein the step of determining whether the use instruction may be moved ahead of one or more other instructions includes the step of identifying a stack-balanced sequence of instructions.

8. The method of claim 7 wherein the step of identifying a stack-balanced sequence of instructions includes the step of identifying a sequence of instructions that, if executed, will cause an equal number of stack push and pop operations to take place in an order such that, throughout execution of the sequence of instructions, the number of completed stack pop operations does not exceed the number of completed stack push operations.

9. The method of claim 1 further comprising the step of determining whether contents of the program variable are pushed onto the stack by an instruction that succeeds the use instruction, and wherein said step of removing is performed only if contents of the program variable are not pushed onto the stack by an instruction that succeeds the use instruction.

10. A method of reducing the number of instructions in a program code sequence, the method comprising the steps of:
   replacing adjacent use instructions in the program code sequence that operate on the same variable with a single use instruction and at least one instruction which, when executed, causes a value on top of a stack to be duplicated on the stack;

removing adjacent definition-use instruction pairs from the program code sequence;

reordering stack push instructions ahead of other instructions in the program code sequence; and repeating the steps of replacing, removing and reordering until no stack push instructions are reordered by said step of reordering.

11. The method of claim 10 wherein the step of reordering stack push instructions ahead of other instructions comprises the step of moving a first stack push instruction ahead of other instructions in the program code sequence to a point at which at least one of the following criteria is satisfied:

the first stack push instruction has been moved ahead of all instructions in the program code sequence that do not cause a value to be pushed onto the stack;

the first stack push instruction cannot be moved further ahead of other instructions without being moved into a stack-balanced sequence of instructions;

the first stack push instruction cannot be moved further ahead of other instructions without being moved ahead of a second stack push instruction that supplies an operand for a non-commutative operation that also receives an operand from the first stack push instruction; and the first stack push instruction cannot be moved further ahead of other instructions without being moved ahead of a stack pop instruction that operates on a program variable that is also operated upon by the stack push instruction.

12. An article of manufacture including one or more computer-readable media having a program code stored thereon which, when executed by a processor, causes the processor to perform the steps of:

identifying in a sequence of instructions a definition instruction and a use instruction that operate on the same program variable, determining whether the use instruction may be moved ahead of one or more other instructions in the sequence of instructions to be adjacent the definition instruction; and removing the use instruction and the definition instruction from the sequence of instructions if the use instruction can be moved ahead of the one or more other instructions to be adjacent the definition instruction.

13. The article of claim 12 wherein the sequence of instructions is a sequence of instructions for execution in a stack-based virtual machine.

14. The article of claim 12 wherein the sequence of instructions is a sequence of Java bytecodes for execution in a Java virtual machine.

15. An article of manufacture including one or more computer-readable media having sequences of instructions stored thereon which, when executed by a processor, cause the processor to reduce the number of instructions in a program code sequence by performing the steps of:

replacing adjacent use instructions that operate on the same variable with a single use instruction and at least one instruction which, when executed, causes a value on top of a stack to be duplicated on the stack;

removing adjacent definition-use instruction pairs from the program code sequence; reordering stack push instructions ahead of other instructions in the program code sequence; and repeating the steps of replacing, removing and reordering until no stack push instructions are reordered by said step of reordering.

16. The article of claim 15 wherein the step of reordering stack push instructions ahead of other instructions comprises the step of moving a first stack push instruction ahead of other instructions in the program code sequence to a point at which at least one of the following criteria is satisfied:

the first stack push instruction has been moved ahead of all instructions in the program code sequence that do not cause a value to be pushed onto the stack;

the first stack push instruction cannot be moved further ahead of other instructions without being moved into a stack-balanced sequence of instructions;

the first stack push instruction cannot be moved further ahead of other instructions without being moved ahead of a second stack push instruction that supplies an operand for a non-commutative operation that also receives an operand from the first stack push instruction; and the first stack push instruction cannot be moved further ahead of other instructions without being moved ahead of a stack pop instruction that operates on a program variable that is also operated upon by the stack push instruction.

17. A computer data signal embodied in a carrier wave and representing sequences of instructions which, when executed by a processor, cause the processor to perform the steps of:

identifying in a computer program a definition instruction and a use instruction that operate on the same program variable;

determining whether the use instruction may be moved ahead of one or more other instructions in the computer program to be adjacent the definition instruction; and removing the use instruction and the definition instruction from the computer program if the use instruction can be moved ahead of the one or more other instructions to be adjacent the definition instruction.

18. The computer data signal of claim 17 wherein the computer program is a sequence of Java bytecodes for execution in a Java virtual machine.

19. A method of preventing reverse-compiling a sequence of bytecodes to obtain program source code, the method comprising the steps of:

removing from the sequence of bytecodes adjacent definition and use instructions that operate on the same program variable; and reordering push instructions within the sequence of bytecodes.

20. The method of claim 19 further comprising the step of replacing a use instruction that is adjacent another use instruction with an instruction to duplicate a value on top of a stack.

21. The method of claim 19 comprising the step of iteratively performing the steps of removing and reordering.

* * * * *